United States Patent [19]

Woo et al.

[11] 4,011,179

[45] Mar. 8, 1977

[54] CONTINUOUS SULFUR FOAM PREPARATION USING POLYISOCYANATES

[75] Inventors: Gar Lok Woo, Tiburon, Calif.; John M. Dale; Allen C. Ludwig, both of San Antonio, Tex.

[73] Assignee: Chevron Research Company, San Francisco, Calif.

[22] Filed: Feb. 7, 1975

[21] Appl. No.: 548,061

Related U.S. Application Data

[63] Continuation-in-part of Ser. No. 382,598, July 25, 1973, abandoned, which is a continuation-in-part of Ser. No. 281,587, Aug. 17, 1972, abandoned.

[52] U.S. Cl. .................... 260/2.5 A; 260/2.5 R; 260/2.5 N; 260/2.5 AM; 260/2.5 AK; 260/2.5 BE; 260/9; 260/18 TN; 260/30.8 R; 260/77 N; 260/859 R
[51] Int. Cl.² ............................................ C08J 9/00
[58] Field of Search ....... 260/2.5 A, 2.5 R, 2.5 AP, 260/75 TN, 77.5 R, 2.5

[56] References Cited

UNITED STATES PATENTS

| 3,892,686 | 7/1975 | Woo | 260/2.5 A |
|---|---|---|---|
| 3,954,685 | 5/1976 | Woo | 260/2.5 A |

*Primary Examiner*—Morton Foelak
*Attorney, Agent, or Firm*—G. F. Magdeburger; John Stoner, Jr.; W. Keith Turner

[57] ABSTRACT

A process for the production of sulfur foam containing at least 50 weight percent sulfur, which comprises:
 a. heating sulfur in a first zone to a temperature above about 100° C to obtain molten sulfur and reacting the molten sulfur with an organic protonic acid which is reactive with molten sulfur so as to incorporate the organic acid with sulfur to form a sulfur-organic acid adduct containing unreacted protonic acid groups;
 b. passing said sulfur adduct in liquid state out of said first zone and into a separate mixer; and
 c. mixing and reacting in said mixer a polyisocyanate with the unreacted acid groups of said sulfur adduct to thereby, upon removal of the polyisocyanate-acid group reaction product from the mixer, release gas and generate a foam.

Preferably the sulfur adduct is formed by reacting sulfur with a plasticizer as well as the acid. The plasticization resulting from phenol reacting with sulfur is particularly preferred, and preferably the liquid phenolmodified sulfur-acid adduct is reacted with polyisocyanate in the mixer within a residence time of 0.1 to 3.0 seconds and within a temperature range of 110° to 140° C.

15 Claims, 1 Drawing Figure

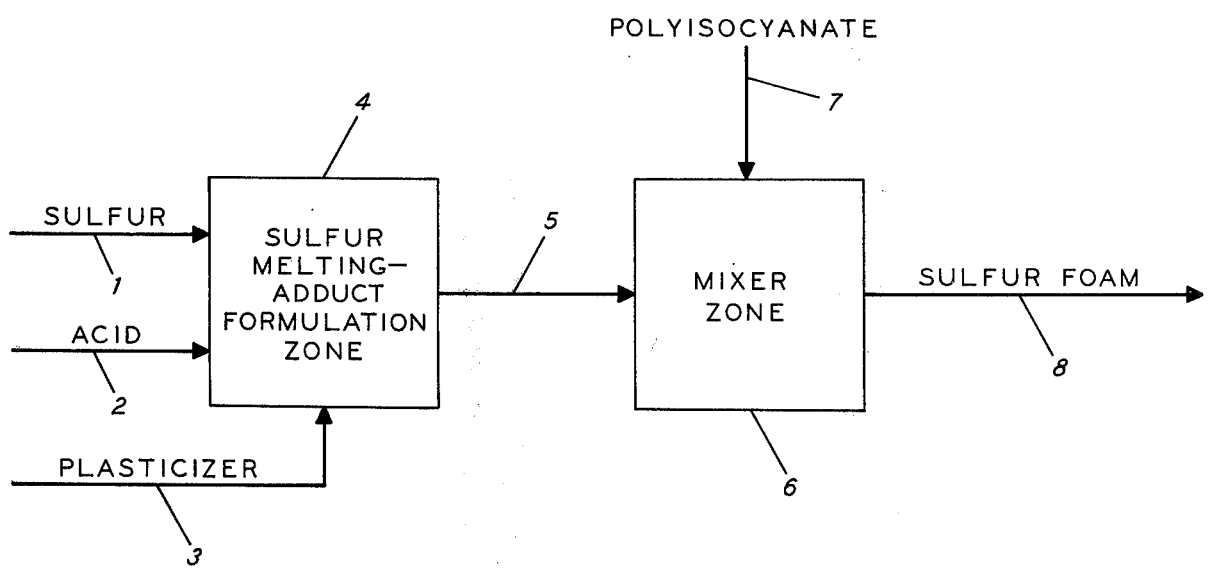

CONTINUOUS SULFUR FOAM PREPARATION USING POLYISOCYANATES

CROSS-REFERENCE TO RELATED APPLICATIONS

This application is a continuation-in-part of application Ser. No. 382,598, filed July 25, 1973, now abandoned, which application, in turn, is a continuation-in-part of application Ser. No. 281,587, filed Aug. 17, 1972, now abandoned.

Also related to this application are commonly assigned applications Ser. No. 344,694, filed Mar. 26, 1973; Ser. No. 438,508, filed Jan. 31, 1974; and Ser. No. 516,229, filed Oct. 18, 1974.

The disclosures of the aforesaid parent and related applications are incorporated herein by reference.

BACKGROUND OF THE INVENTION

The present invention relates to the preparation of a foamed material, particularly a sulfur foam.

U.S. Pat. No. 3,337,355, issued to Dale and Ludwig, discloses the production of a sulfur foam using the following steps:

a. heating sulfur to above its melting point;
b. blending a stabilizing agent with the molten sulfur;
c. blending a viscosity increaser with the molten sulfur, steps (b) and (c) being taken in either order with respect to the other;
d. forming bubbles in the molten sulfur, and
e. cooling the molten sulfur to below its melting point.

Stabilizing agents disclosed include talcs, mica and plate-like particles. Viscosity increasers disclosed include phosphorus sulfide, styrene monomers and polysulfide liquids. According to U.S. Pat. No. 3,337,355:

"The forming of bubbles in the molten sulphur may be done in any conventional manner for forming foams generally such as those methods used in forming plastic foams. These include (1) mechanically mixing a gas such as air with the molten sulphur, (2) adding a blowing agent, and (3) mixing a liquid with the molten sulphur while maintaining a predetermined pressure on the sulphur and then releasing the pressure on the sulphur sufficiently that the liquid will vaporize at the temperature and lower pressure involved. All of these methods must use material free from substances having a deleterious effect upon the process. For example, most members of the halogen family will decrease the viscosity of the sulphur sufficiently that proper foams will not be formed. Examples of blowing agents that are satisfactory are a combination of sodium carbonate or bicarbonate and acid, N,N'-dimethyl N,N'-dinitrosoterephthalamide sold under the trade name Nitrosan, sodium bicarbonate dispersed in a neutral oil sold under the trade name Unicel S, and N,N'-dinitrosopentamethylenetetramine sold under the trade name Unicel ND. Nitrosan, Unicel S, and Unicel ND are products of E. I. du Pont de Nemours & Co."

According to the examples in U.S. Pat. No. 3,337,355, typical ingredients for the sulfur foam include sulfur, talc, $P_2S_5$, calcium carbonate and phosphoric acid.

By retrospect in view of the present invention, art in the area of polyurethane foams can also be referred to by way of background. As indicated in Kirk-Othmer Encyclopedia of Chemical Technology (1965), Vol. 9, p. 853, the chemical ingredients of a urethane foam are a polyfunctional isocyanate (1) and a hydroxyl-containing polymer (2) along with catalysts to control the rate and type of reaction and other additives to control the surface chemistry of the process. A number of competing reactions can occur when (1) and (2) are brought together, but the main product, shown in the equation below, is a polyurethane (3).

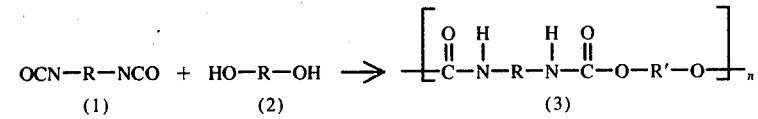

Originally, carbon dioxide was generated in situ (by the reaction of isocyanate with water) as a blowing agent for both rigid and flexible polyurethane foams. U.S. Pat. No. 2,814,600 discloses production of polyurethane foams by reaction of isocyanate groups with water to release carbon dioxide.

It is said to still be the common practice today to rely largely on reaction of water with isocyanate as a method for gas generation for flexible materials. Rigid cellular polyurethanes are now typically produced using volatile liquids, usually fluorocarbons, which act as expanding agents, producing gas as the foaming mixture is heated by the exotherm of the reaction.

Although it is not the typical method used to make polyurethane foams, it has been disclosed to react carboxylic acid groups with isocyanate groups to form amide bonds and release carbon dioxide. See, for example, Saunders and Frisch, "Polyurethanes", Part I, Interscience Publishers (1962) at p. 79.

U.S. Pat. No. 3,222,301 discloses polyurethane foams containing a small amount of dissolved sulfur to prevent discoloration of the polyurethane foam. As can be seen from the examples of U.S. Pat. No. 3,222,301, only a very small amount of sulfur is included in the final foam; one of the reactants for formation of the foam can pick up the necessary small amount of sulfur by filtering the reactant through finely divided sulfur prior to using the reactant to form the foam.

U.S. Pat. No. 3,542,701 discloses the use of sulfur in various foams, including polystyrene foams as well as polyurethane foams, to decrease the inflammability of the foam. According to U.S. Pat. No. 3,542,701, "The total amount of elementary sulfur in the foam or other cellular structure may be as high as slightly under 50% by weight". The process of U.S. Pat. No. 3,542,701 is stated to be: " . . . applicable to all foams or other cellular or porous structures of combustible synthetic macromolecular substances, without exceptions, although the best results are obtained with substances, which at the temperatures applied in the preparation of the foams or other cellular or porous structures of these substances hardly react with sulfur if at all."

U.S. Pat. No. 2,814,600 and 3,169,119 disclose the production of polyurethane foams from arylene diisocyanates and liquid polysulfide polymers. U.S. Pat. No. 3,169,119 discloses the use of a "foam stabilizer" or surfactant, such as a silicone oil, for example a polydimethyl siloxane or an alkyl silane polyoxyalkylene block copolymer. The latter type of silicone oil is disclosed in U.S. Pat. No. 2,834,748.

U.S. Pat. No. 3,645,924 also discloses, at Col. 7, line 52 to Col. 8, line 22, surfactants which can be employed to obtain uniform cell structure in making polyurethane foams.

Similarly, U.S. Pat. No. 3,706,680 discloses the use of poly organo silicone compounds as well as polypropylene glycols as suitable surface active agents or emulsifiers that can be used in polyurethane foam production.

"Polyurethane Techology," edited by P. F. Brunes, Interscience Publishers, 1969, describes in general at pp. 50–52 the use of poly organo silicone surfactants in polyurethane foam preparation. At page 51, the following is stated: "The surfactant may be added with any of the two to six streams usually fed to the mixing head in the one-shot process. The addition of the silicone as a separate stream affords the maximum in control over loss of foam stability, since surfactant concentration may be adjusted independently of reactants and catalysts."

SUMMARY OF THE INVENTION

According to the present invention, a process is provided for the production of sulfur foam containing at least 50 weight percent sulfur, which process comprises:
a. heating sulfur in a first zone to a temperature above about 100° C to obtain molten sulfur and reacting the molten sulfur with an organic protonic acid which is reactive with molten sulfur so as to incorporate the organic acid with sulfur to form a sulfur-organic acid adduct containing unreacted protonic acid groups;
b. passing said sulfur adduct in liquid state out of said first zone and into a separate mixer; and
c. mixing and reacting in said mixer a polyisocyanate with the unreacted acid groups of said sulfur adduct to thereby, upon removal of the polyisocyanate-acid group reaction product from the mixer, release gas and generate a foam.

Among other factors, the present invention is based on our finding that the multi-zone process of the present invention is very advantageous for producing sulfur foam continuously and for attaining good-quality foam with relative ease of controllability of the process.

The term "adduct" is used herein to connote formation of one or more chemical bonds between the sulfur and the organic acid.

The term "foam" is used herein to mean a cellular material containing a gas in the cells. When initially formed, the foam may be finely divided gas bubbles in liquid, but after a short time, the foam becomes a flexible or rigid solid containing gas bubbles.

The foams prepared in accordance with the present invention contain more than about 50 weight percent sulfur. Earlier commonly assigned application Ser. No. 438,508 is directed to a basic process for preparing this type of foam by reacting a sulfur-organic acid adduct material with a polyisocyanate. The foams contemplated by the present invention contain large amounts of sulfur.

The reactions of the present invention are preferably carried out under substantially anhydrous conditions, for example, less than 0.2 weight percent water, based on the sulfur.

The organic acids used in the present invention are restricted to those which are reactive with molten sulfur, i.e., reactive with sulfur at a temperature above about 115° C., to yeild a sulfur-organic acid adduct. Preferably the temperature range of this reaction is about 115° to 235° C. More preferably, the temperature range is 135°–160° C.

In the present invention, a wide variety of acids can be used, as the present invention is based on a combination of steps wherein the substances used for the steps must perform certain functions, as are indicated herein. The acids must retain the acid moiety after reaction with sulfur.

The organic acids which are disclosed in the aforesaid Ser. No. 253,144 and Ser. No. 344,694 can in general be used in the present invention.

Exemplary acids include sulfur-containing acids such as dithiodipropionic acid, dithioglycolic acid, and other similar-acting dithio acids; mercaptoacetic acid, 3-mercaptopropionic acid, and other similar-acting mercapto acids, 1,2-dithiane-3,6-dicarboxylic acid, 1,2-dithiolane-4-carboxylic acid, 6,8-thioetic acid, p-mercaptobenzoic acid, mercaptophenylacetic acid, etc.; unsaturated monocarboxylic acids such as acrylic acid, oleic acid, methacrylic acid, monoesters of maleic or fumaric acid (methyl fumarate), monoallyl esters of dibasic acids (allyl succinate, allyl adipate), etc.; unsaturated polycarboxylic acids having at least 5 carbon atoms such as 2-pentene-1,5-dicarboxylic acid; 4-octene-1,8-dicarboxylic acid, 3-hexene-1,6-dicarboxylic acid; acid-esters having unsaturation formed by the reaction of an unsaturated dibasic or polybasic acid and a polyhydric alcohol or monoesters of a saturated polybasic acid and an unsaturated polyhydric alcohol (trimethylolpropanetrimaleate), etc.; and saturated acids which in the presence of molten sulfur are converted to sulfurized acids such as palmitic acid, stearic acid, hexane carboxylic acid, various naphthenic acids, etc.

Among the useful sulfonic acids are hexane sulfonic acid, dodecylbenzene sulfonic acid, beta-hydroxyoctane sulfonic acid, 3-hexene sulfonic acid, etc. Among other useful acids are octadecylbenzeneboronic acid, vinylbenzene boronic acid, 3-pentenylphosphinic acid, dihexylphosphinic acid, dicrotyl hydrogen phosphate, the cyclic diesters of boric acid, saturated and unsaturated cis-1,2- and 1,3-diols, etc.

The organic carboxylic acids are particularly preferred, especially monoolefinic carboxylic acids having from 3 to 30, preferably from 3 to 15, carbon atoms. In this connection, it can be noted that some saturated acids will be satisfactory for use in the present invention. For example, if a saturated acid such as hexadecanoic acid is heated with sulfur, hydrogen sulfide is evolved and the hexadecanoic acid is dehydrogenated to form an unsaturated acid, which is then further transformed into a sulfurized acid. Unsaturated acids are preferred reactive acids for forming the sulfur-acid adduct. The unsaturated acids are believed to react with the molten sulfur principally at the double (or triple) carbon-carbon bond. Dithio organic acids are believed to react with the molten sulfur at the sulfur-sulfur bond of the dithio acid. In any case, in accordance with the present invention, the organic acid must react with the sulfur to form a sulfur-organic acid adduct containing protonic acid groups.

Preferably, the unsaturated, dithio or mercapto acids used in the process of the present invention have from 2 to 30 carbon atoms. Particularly preferred organic acids for use in the process of the present invention include acrylic acid, dithiodipropionic acid, 3-mercaptopropionic acid, 2-mercaptobenzoic acid, methacrylic acid and 2-mercaptoacetic acid.

The quantity of acid to be incorporated varies from 0.001 to 1.0, preferably 0.005 to 0.15, g-mol acid equivalents per 100 grams of sulfur. When the foaming agent is carbon dioxide resulting from an acid/isocyanate reaction, the higher levels of acid concentration give foams of low bulk density, whereas the lower levels result in foams of high bulk density.

Acrylic acid is an especially preferred acid for use in the process of the present invention. In general, preferred amounts of acrylic acid for use in the present invention are from 0.2 to 15, more preferably from 1 to 7, in weight percent, calculated as weight percent of the sulfur. It should be recognized that higher quantities of acid may be reacted with sulfur to form the adduct, and then this adduct can be diluted with sulfur to give a final acid concentration within the above ranges.

The polyisocyanates used herein are cross-linking agents which react with the acid groups of the sulfur-acid adduct to liberate carbon dioxide and at the same time effect cross-linking. Suitable polyisocyanates include both aliphatic and aromatic isocyanates, as are defined in the above-referenced patent applications, Ser. Nos. 253,144 and 344,694. The polyisocyanates must be soluble or liquid at the foaming temperature.

Preferred polyisocyanates for use in the present invention are di- and triisocyanates which are soluble or liquid at the molten-sulfur foaming temperature. Particularly preferred are the relatively low volatility mixed isocyanates sold under the trade names of pAPI and MONDUR MR. The isocyanate groups of the polyisocyanate used in the process of the present invention will be part of an organic compound; the important feature of the organic polyisocyanate compound is that it contains at least two isocyanate groups capable of reacting with a protonic acid group to form an amide bond and release carbon dioxide. Many such polyisocyanate compounds are known by those skilled in the art.

The organic polyisocyanates which may be employed include aromatic and aliphatic as well as heterocyclic materials. Examples of suitable aromatic materials include tolylene 2,4-diisocyanate, 4,4'-diphenylmethane diisocyanate, tolylene 2,6-diisocyanate, polymethylene polyphenyl isocyanate (polymeric material made by Upjohn), bitolylene diisocyanate, dianisidene diisocyanate, triphenylmethane diisocyanate, and 3,3'-dichloro-4,4'-diphenylene diisocyanate. The aliphatic and cycloaliphatic materials which may be employed include such materials as hexamethylene diisocyanate, ethylidene diisocyanate, propylene-1,2-diisocyanate, cyclohexylene-1,2-diisocyanate, etc. The isothiocyanate analogs of these materials may be employed, examples of which include ethylidene diisothiocyanate, butylene-1,2-diisothiocyanate and paraphenylene diisothiocyanate.

Another type of polyisocyanate useful in the process of this invention is the so-called prepolymer adducts of a polyhydroxy, polythiol or polyamino compound and excess polyisocyanate, for example, the product from the reaction of one mol of ethylene glycol and two mols of toluene diisocyanate. In general, the pre-polymers have the formula:

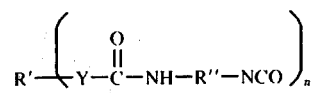

wherein R' is the nucleus of a polyhydric compound having n hydroxy groups, R'' is a diradical, Y is O, S, or NR''', R''' is H or low-molecular-weight alkyl group or an aryl group, and n has a value of 2 to 6. Typical compounds include the reaction product of toluene diisocyanate with diethylene glycol, of p,p'-diphenylmethane diisocyanate with trimethylolpropane, of m-xylylene diisocyanate with decane 1,10-diol and of toluene diisocyanate with the adduct of trimethylol propane and propylene oxide and/or ethylene oxide, toluene diisocyanate with polytetramethylene glycol, etc. The preferred polyisocyanates are aromatic diisocyanates having boiling points higher than 130° C., and mobile at the molten-sulfur foaming temperature.

Particularly preferred polyisocyanates are hexamethylene diisocyanate, dianisidene diisocyanate, tolylene 2,4-diisocyanate, 4,4'-diphenylmethane diisocyanate, polymethylene polyphenyl isocyanate, 4,4'-diphenylene diisocyanate.

Polyisothiocyanates are also suitable for use in making sulfur foams by the process of the present invention. When using isothiocyanates, the blowing or foaming agent formed by reaction with the acid contains COS. Satisfactory polyisothiocyanates are any of the above polyisocyanates having an isothiocyanate group in place of the isocyanate group.

In a preferred method of carrying out the process of the present invention, the sulfur may be plasticized by the addition of about 1 to 99, preferably 1 to 50, parts of a plasticizer per 100 parts of sulfur. Preferably after plasticization is complete, the organic acid is added to form the sulfur-acid adduct using the plasticized sulfur, and the process is continued as before. In another embodiment, the plasticizer can be added to the sulfur-acid mixture. The acid and plasticizer can also be added to the sulfur simultaneously. Plasticizers are useful to reduce cracking, especially surface cracking as occurs with some unplasticized sulfur foam. The acid ingredient itself is sometimes a sufficient plasticizer, but at other times extra, nonacidic plasticizers are needed or at least or advantageous in producing a good sulfur foam. Plasticizers are well known in the sulfur art (see Alberta Sulfur Research, Ltd., Quarterly Bulletin, Vol. VIII, No. 4, January–March 1972), and frequently include compounds having one or more sulfur atoms in the molecule.

Plasticized sulfur usually has a lower melting point and a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C. and is then covered with a square microscope slide cover slip. The slide is transferred to a hotplate and is kept at a temperature of 78° ±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to or reacted with molten, elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in Ser. No. 344,694) required 2.9 minutes. Sulfur containing 6.6% and 9.9% of the same phenol-sulfur adduct required 5.7 and 22 minutes, respectively.

Inorganic plasticizers include iron, arsenic and phosphorus sulfides, but the particularly preferred plasticizers are organic compounds which can react with sulfur to give sulfur-containing materals, such as styrene, alphamethylstyrene, dicyclopentadiene, vinyl cyclohexene, the aromatic compound-sulfur adducts of Ser. No. 344,694, as well as the aromatic compounds used to produce these adducts, liquid polysulfides (e.g., those sold under the trade name of Thiokol LP-3 or LP-32), and the viscosity control agents described in U.S. Pat. Nos. 3,674,525, 3,453,125 and 3,676,166. The preferred aromatic plasticizing compounds are styrene and the phenolsulfur adduct of Ser. No. 344,694. The preferred aliphatic compounds are dicyclopentadiene and linear polysulfides. When phenol is used as the plasticizer, in order to obtain plasticization it is necessary to get the phenol to react with the sulfur; this reaction can advantageously be effected using base catalysis, e.g., using sodium hydroxide.

The quantity of plasticizer to be added varies with the nature of the plasticizer, but usually is in the range 0.5 to 40 weight percent, based on the final composition. Styrene, for example, is preferably used at the 1- to 10-weight-percent level, whereas polyunsaturated olefins such as dicyclopentadiene are preferably used at the 1- to 5-weight-percent level. The upper limit on plasticizer concentration is determined by the viscosity of the resulting plasticized sulfur. Final viscosity must be such that the composition will flow at the desired temperatutre and will also be able to be mixed with liquid polyisocyanate.

Thus, in accordance with a preferred embodiment of the present invention, a process is provided for the production of sulfur foam containing at least 50 weight percent sulfur, which process comprises:

a. heating sulfur in a first zone to a temperature above about 100° C to obtain molten sulfur and reacting the molten sulfur with a plasticizer and an organic protonic acid which are reactive with sulfur to thereby obtain a modified sulfur-organic acid adduct containing unreacted protonic acid groups;

b. passing said modified sulfur-organic acid adduct in liquid state out of said first zone and into a separate mixer; and c. mixing and reacting in said mixer a polyisocyanate with the unreacted acid groups of said modified sulfur-organic acid adduct to thereby, upon removal of the polyisocyanate-acid group reaction product from the mixer, release gas and generate a foam.

The plasticizer can be added to the first zone and reacted with the sulfur ether before, after, or simultaneously with the reaction of the sulfur with the organic acid. Preferably the plasticizer is reacted with the sulfur first and then the acid is reacted with the sulfur. The plasticizer may be reacted with the sulfur in a separate vessel and then passed to a further vessel for reaction of the plasticized sulfur with the organic acid. Also, still a further reactor or vessel can be used to add more sulfur to the modified sulfur-acid adduct. In any case, in the present invention the modified sulfur-acid adduct or the sulfur acid adduct must be generated in a separate first zone, which zone may comprise one or more reactors or vessels, and then the sulfur-acid adduct or modified sulfur-acid adduct must be discharged and passed out of the first zone, e.g., the last reactor or vessel of the first zone which contains the modified sulfur-acid adduct at a molten temperature, and into a mixer separate from said first zone wherein reaction of the acid groups of the sulfur adduct with a polyisocyanate is initiated. Upon removal of the reaction product from the mixer (e.g., by exiting the mixture via a hose from the mixer) a foam is formed as gas is released as the foaming reaction progresses.

In addition to the use of a plasticizer in some embodiments of the present invention, another optional ingredient is a solid stabilizer, which is defined as finely divided, inert material having individual particles which are plate-like in form. Examples include talc, mica, carbon black, aluminum pigment, kaolin, etc. This ingredient is usually added to the molten-sulfur mixture just before the cross-linking agent(s) is added. When used, the quantity of stabilizer varies from 1 to 15 parts per 100 parts of sulfur. Preferably the stabilizer is added prior to the addition of the isocyanate and prior to the addition of a surfactant. The advantageous use of a surfactant is described in the previously cited commonly assigned applications, particularly including Ser. No. 516,229.

In addition to, or in place of, the previously described additives, in certain applications it is desirable to add to the foam compositions other nonplate-like materials, typically those which have been employed as fillers in plastic foams. Materials of this type are described in "Plastic Foams," Vol. I, Calvin James Banning, Wiley-Interscience, 1969. Examples of such fillers include wood-derived materials such as wood flour, resins, and synthetic fibers such as nylon acrylics and polyesters, inorganic salts and oxides such as heavy metal oxides to modify electrical properties, silica and various silicates, etc. Another group of materials which can be used to modify physical properties of the foams are the inorganic flakes and fibers represented by glass fiber, mica and asbestos fillers, etc. Such fillers are employed at concentrations in the range of about 1 to 15 parts per 100 parts of sulfur, depending on the viscosity or thixotropic property of the final material. The above stabilizers and additives are particularly useful and important for getting good cell-structure foam when the amount of cross-linking is low.

THE DRAWING

The drawing is a schematic process flow diagram illustrating in simplified form a preferred embodiment of the present invention.

Referring to the drawing, sulfur in line 1, organic acid in line 2, and plasticizer in line 3 are added to sulfur melting-adduct formulation zone 4. Therein the sulfur is heated and maintained at molten conditions, preferably a temperature between about 110° and 160° C, and is reacted with the plasticizer and acid to form a modified sulfur-acid adduct.

The adduct is passed via line 5 to mixer zone 6. Polyisocyanate is added via line 7 to the mixer of zone 6 and is mixed with the sulfur-acid adduct to initiate reaction of the unreacted acidic groups of the adduct with isocyanate to thereby, upon removal of the reaction product from the mixer via line 8, release gas and generate a sulfur foam. The foam is formed as the foaming reaction progresses after removal of the reaction product from zone 6 via line 8.

We have found that a residence time in the mixer of about 0.01 to 10.0, preferably about 0.1 to 3.0, and more preferably between about 0.3 to 2.0, seconds is important in producing good-quality sulfur foams by the process of the present invention. We have discovered that residence times above about 3.0 and especially above 5.0, seconds in the mixer result in poorer-quality foams and operational difficulties.

Preferred residence times, in general, have been found to be those such that the foaming mixture is intimately mixed and removed from the mixer and hose before any substantial foaming occurs. The residence time desired is affected by temperature in the mixer, lower temperatures allowing a longer residence time.

In referring to residence time in the mixer, the term "mixer" is used herein in the claims to include the mixer and foam outlet means connected to the mixer. Also, the residence times in the mixer given above are on the basis that the polyisocyanate is added immediately ahead of the mixer.

We have also found that temperatures in the mixer of about 100° to 160° C, preferably 100° to 140° C, and more preferably between about 105° and 125° C are important in producing good-quality sulfur foams by the process of the present invention. In this connection, the temperature referred to is that in the mixing device, e.g., dynamic pump, per se and a lower temperature (or higher temperature due to the exotherm of the reaction with isocyanate) may prevail in the foam outlet line downstream from the mixer device. We have also found that the preferred temperature varies somewhat with the thickness to which the sulfur foam is laid out on discharge from the outlet hose. The temperature in the mixture is controlled or determined usually by the temperature maintained in the heated vessel from which the modified or unmodified sulfur-acid adduct material is discharged into the mixer. Frequently it is desirable to carry out reaction in the heated vessel immediately before the mixer at a higher temperature and then allow, or provide for, the material to cool somewhat before discharging the material to the mixer.

EXAMPLES

EXAMPLE 1

A large kettle was charged with 402 pounds of sulfur which was heated to 142° C. Then 57 pounds of a sulfur concentrate (prepared by heating 14 parts by weight of acrylic acid with 86 parts by weight of a phenol-sulfur reaction product containing 30% by weight of phenol) and 57 pounds of a sulfur concentrate (prepared by heating 12 parts by weight of acrylic acid with 88 parts by weight of a phenol-sulfur reaction product containing 30% by weight of phenol) were added over 45 minutes. The resulting mixture was stirred at 135°–140° C for 1½ hours. At the end of this time, the plasticized sulfur-acid adduct was cooled to 123°–125° C. This material, at a rate of 40.5 pounds per minute, was mixed with a silicone-type surfactant (Dow's surfactant DC-193), at a rate of 0.23 pounds per minute, and the resulting combination was fed to a dynamic (pump) mixer turning at 2500 RPM. The temperature of the surfactant added was room temperature or slightly above. Thus the temperature of the combined streams to the mixer was about 120°–124° C. A mixture of polyisocyanates (Mondur MR Polyisocyanate) was charged to this same mixer at a rate of 3.7 pounds per minute. The temperature of the polyisocyanate added was room temperature or slightly above. Thus the temperature of the combined streams to the mixer was about 120°–124° C. The 2 streams were mixed for 0.6 seconds in the pump. This composition was then passed through a 7 inch-long × 0.5 inch-I.D. spout (0.1 second residence time for a total residence time of 0.7 second in the "mixer", i.e., pump plus discharge hose) into several molds, including a 2 foot × 3 foot mold wherein foaming occurred to an average depth of 2 inches. The resulting blocks of foam had densities in the range of 13 to 14 pounds per cubic foot. The cells were of uniform, small size.

EXAMPLE 2 a. This example was carried out much the same as Example 1, except the final plasticized sulfur-acid adduct was prepared from 390 pounds of sulfur and 65 pounds of each of the previously described concentrates. The final composition at 120° C was combined at 37.5 pounds per minute in a static mixer with 0.23 pounds per minute of a silicone surfactant (DC-193). The resulting mixture was fed to a dynamic mixer wherein it was mixed with 2.8 pounds per hour of mixed polyisocyanates (Mondur MR). Average residence time in the mixer was 0.6 seconds. The resulting foam precursor composition was passed through 3' of a ½ inch-diameter hose into various molds wherein foaming occurred. Average residence time in the hose was 0.6 seconds, so that the total residence time in the "mixer" (mixer plus discharge hose) was 1.2 seconds. The resulting sulfur foam density was 13.6 pounds per cubic foot.

b. The same procedure as in Example 2(a) was followed, except that the polyisocyanates were charged to the mixer at 3.2 pounds per minute, resulting in an average residence time in the mixer and hose of 1.2 seconds. The resulting foam had an average density of 12.5 pounds per cubic foot.

c. The same procedure as in Example 2(a) was followed except that the polyisocyanates were charged at 3.6 pounds per minute, resulting in an average residence time in the mixer and hose of 1.2 seconds. The resulting foam had a density of 11.9 pounds per cubic foot.

What is claimed is:

1. A process for the production of sulfur foam containing at least 50 weight percent sulfur, which consists essentially of:
   a. heating sulfur in a first zone to a temperature above about 100° C to obtain molten sulfur and reacting the molten sulfur with an organic protonic acid which is reactive with molten sulfur so as to incorporate the organic acid with sulfur to form a sulfur-organic acid adduct containing unreacted protonic acid groups;
   b. passing said sulfur adduct in liquid state out of said first zone and into a separate mixer; and
   c. mixing and reacting in said mixer a polyisocyanate with the unreacted acid groups of said sulfur adduct to thereby, upon removal of the polyisocyanate-acid group reaction product from the mixer, release gas and generate a foam.

2. A process in accordance with claim 1 wherein the acid is a carboxylic acid.

3. A process in accordance with claim 1 wherein the organic acid is an unsaturated acid, a dithio acid, or a mercapto acid.

4. A process in accordance with claim 1 wherein the organic acid is an unsaturated aliphatic carboxylic acid containing from 3 to 30 carbon atoms.

5. A process in accordance with claim 1 wherein the organic acid is acrylic acid.

6. A process in accordance with claim 1 wherein the polyisocyanate is an aryl isocyanate containing 2 or 3 isocyanate groups.

7. A process for the production of sulfur foam containing at least 50 weight percent sulfur, which consists essentially of:
  a. heating sulfur in a first zone to a temperature above about 100° C to obtain molten sulfur and reacting the molten sulfur with a plasticizer and an organic protonic acid which are reactive with sulfur to thereby obtain a modified sulfur-organic acid adduct containing unreacted protonic acid groups;
  b. passing said modified sulfur-organic acid adduct in liquid state out of said first zone into a separate mixer; and
  c. mixing and reacting in said mixer a polyisocyanate with the unreacted acid groups of said modified sulfur-organic acid adduct to thereby, upon removal of the polyisocyanate-acid group reaction product from the mixer, release gas and generate a foam.

8. A process in accordance with claim 7 wherein the organic acid is a carboxylic acid.

9. A process in accordance with claim 7 wherein the organic acid is acrylic acid.

10. A process in accordance with claim 9 wherein the plasticizer is phenol.

11. A process in accordance with claim 10 wherein the residence time in said mixer is between 0.01 and 10 seconds.

12. A process in accordance with claim 10 wherein the residence time in said mixer is between 0.1 and 3.0 seconds.

13. A process in accordance with claim 11 wherein the temperature maintained in said mixer is between 100° and 160° C.

14. A process in accordance with claim 11 wherein the temperature maintained in said mixer is between 100° and 140° C.

15. A process in accordance with claim 11 wherein the temperature maintained in said mixer is between 115° and 125° C.

* * * * *